(12) United States Patent
Mortland

(10) Patent No.: US 10,974,816 B2
(45) Date of Patent: Apr. 13, 2021

(54) HIGH-FOWLER FLAP ACTUATION APPARATUS AND RELATED METHODS

(71) Applicant: The Boeing Company, Chicago, IL (US)

(72) Inventor: Michael T. Mortland, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 580 days.

(21) Appl. No.: 15/719,393

(22) Filed: Sep. 28, 2017

(65) Prior Publication Data
US 2019/0092454 A1 Mar. 28, 2019

(51) Int. Cl.
*B64C 13/28* (2006.01)
*B64C 9/16* (2006.01)
*B64C 9/02* (2006.01)

(52) U.S. Cl.
CPC .............. *B64C 13/28* (2013.01); *B64C 9/16* (2013.01); *B64C 9/02* (2013.01)

(58) Field of Classification Search
CPC .. B64C 13/28; B64C 9/16; B64C 9/02; B64C 13/16
See application file for complete search history.

(56) References Cited

U.S. PATENT DOCUMENTS

| | | |
|---|---|---|
| 2,405,726 A | 8/1946 | Zap |
| 4,007,896 A | 2/1977 | Reynolds, III |
| 4,381,093 A | 4/1983 | Rudolph |
| 4,405,105 A | 9/1983 | Dilmaghani et al. |
| 4,460,138 A | 7/1984 | Sankrithi |
| 4,544,118 A | 10/1985 | Robinson |
| 4,605,187 A | 8/1986 | Stephenson |
| 4,995,575 A | 2/1991 | Stephenson |
| 5,052,641 A | 10/1991 | Coleman |
| 6,010,097 A * | 1/2000 | Cox .......................... B64C 9/16 244/216 |
| 6,481,667 B1 * | 11/2002 | Ho ............................ B64C 3/48 244/99.11 |
| 8,684,316 B2 | 4/2014 | Sakurai et al. |

(Continued)

FOREIGN PATENT DOCUMENTS

DE 2354420 A1 5/1975
EP 0154047 A1 9/1985
(Continued)

OTHER PUBLICATIONS

European Patent Office, "European Search Report," dated Jan. 15, 2001, in connection with European Patent Application No. 98306207 (2 pages).

(Continued)

Primary Examiner — Valentina Xavier
(74) Attorney, Agent, or Firm — Hanley, Flight & Zimmerman, LLC

(57) ABSTRACT

Example high-fowler flap actuation apparatus and related methods are disclosed. An example apparatus includes a control surface operatively coupled to a wing of an aircraft via a first support arm and a drive arm, the drive arm linearly extendible from a retracted position to a deployed position, the deployed position including the control surface extended away from the wing at a first angle with respect to the wing.

20 Claims, 13 Drawing Sheets

(56) References Cited

U.S. PATENT DOCUMENTS

| | | | |
|---|---|---|---|
| 9,573,673 B2* | 2/2017 | Parker | B64C 9/02 |
| 10,017,243 B2* | 7/2018 | Moser | B64C 13/34 |
| 2011/0006155 A1 | 1/2011 | Kracke | |
| 2011/0253832 A1 | 10/2011 | Wildman et al. | |

FOREIGN PATENT DOCUMENTS

| | | |
|---|---|---|
| EP | 0210399 A2 | 2/1987 |
| EP | 0909705 A2 | 4/1999 |
| EP | 2316727 A1 | 5/2011 |
| EP | 2272752 A2 | 12/2011 |
| EP | 2886451 A1 | 6/2015 |
| FR | 812036 A | 4/1937 |
| FR | 2856655 A1 | 12/2004 |
| GB | 489853 A | 8/1938 |
| GB | 2277305 A | 10/1994 |
| WO | 9609955 A | 4/1996 |

OTHER PUBLICATIONS

European Patent Office, "European Search Report," dated Mar. 1, 2019, in connection with European Patent Application No. 18196188 (7 pages).

European Patent Office, "Communication pursuant to Article 94(3)", issued in connection with EP patent application No. 18196188.9-1010, dated Feb. 8, 2021 (4 pages).

* cited by examiner

HIGH-FOWLER FLAP ACTUATION APPARATUS AND RELATED METHODS

FIELD OF THE DISCLOSURE

This disclosure relates generally to aircraft and, more particularly, to high-fowler flap actuation apparatus and related methods.

BACKGROUND

When traveling at relatively slow speeds, many aircraft employ high-lift devices such as flaps and slats to increase overall wing lift characteristics. Engagement of such devices, which are operatively coupled to an aircraft wing, increases lift but also increases drag. Therefore, such devices are not advantageous at high speeds where high drag is detrimental to flight performance and high lift is less beneficial.

Figure 1:
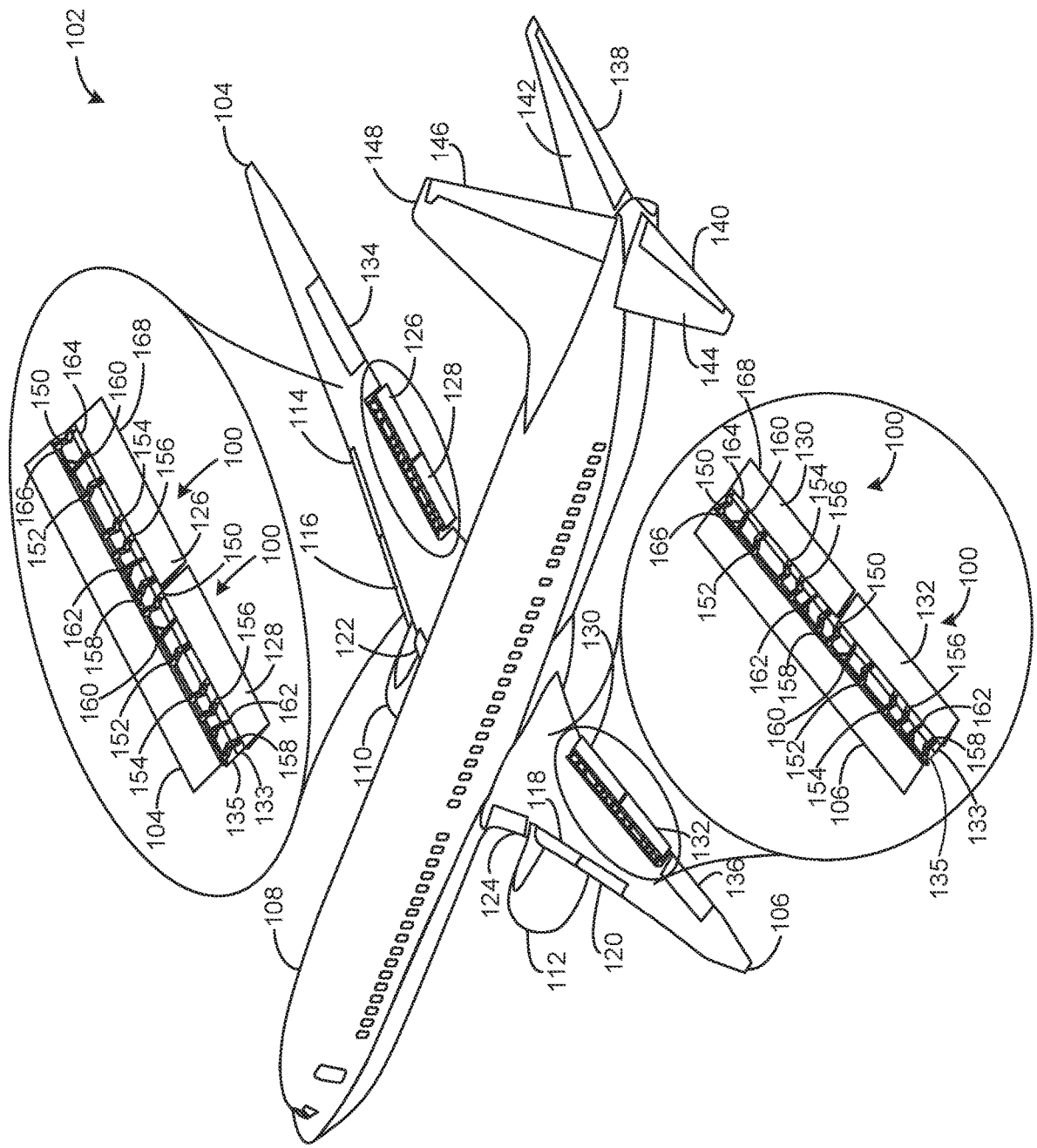
FIG. 1 is an isometric view of an example high-fowler flap actuation apparatus coupled to an example aircraft to implement the examples disclosed herein.

The figures are not to scale. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

DETAILED DESCRIPTION

High-fowler flap actuation apparatus and related methods are disclosed. An example apparatus includes a control surface operatively coupled to a wing of an aircraft via a first support arm and a drive arm, the drive arm linearly extendible from a retracted position to a deployed position, the deployed position including the control surface extended away from the wing at a first angle with respect to the wing.

Another example apparatus a main wing portion of an aircraft including an upper surface, a lower surface, a control surface, and a cavity between a portion of the upper surface and the lower surface, and a drive arm disposed in the cavity including a first linear body and a second linear body, the first and the second linear bodies extendible from a retracted position to a deployed position.

An example method includes engaging an actuator coupled to a drive arm coupled to a control surface, extending the drive arm from a first position to a second position, and extending a control surface from a retracted position to a deployed position, the deployed position including the control surface extending away from a main wing portion of an aircraft wing at a first angle with respect to the main wing portion, the first angle based on a second angle.

Typical aircraft use dynamic control surfaces such as flaps and slats to optimize aerodynamic properties of the aircraft. Additionally or alternatively, typical aircraft may use ailerons, elevators, rudders, spoilers, etc., to optimize the aerodynamic properties of the aircraft. Flaps are aerodynamic surfaces on a leading edge (e.g., a Krueger flap) or a trailing-edge (e.g., a Fowler flap) of a wing of an aircraft that can be used to increase lift of the wing at a given airspeed. For example, deploying the flap(s) during flight may increase the lift-to-drag ratio experienced by the aircraft to lower the approach speed of the aircraft and/or to increase the angle of attack for landing (e.g., the angle of descent, etc.).

In some examples, the flaps are operatively coupled to one or more actuators (e.g., an electromechanical actuator, an electrohydraulic actuator, an electric backup hydraulic actuator, a hydraulic actuator, etc.) and/or one or more motors (e.g., an electric motor, a hydraulic motor, etc.) to move the flaps from a retracted or a stowed position to a deployed position, or an intermediate position. In some examples, the flaps are Fowler flaps. For example, the flaps may be trailing-edge split flaps operatively coupled to a main portion of an aircraft wing that slide backwards (e.g., opposite the path of travel of the aircraft) before hinging in a downward direction. In such an example, the flap may first increase a chord of the main wing before increasing a camber of the main wing. The chord refers to an imaginary straight line joining a leading edge of an airfoil and a trailing edge of the airfoil while the camber refers to an asymmetry between a top and a bottom surface of the airfoil.

In prior examples, a use of Fowler flaps on an aircraft wing included using one or more fairings to cover external actuator mechanisms that actuate, control, etc., the Fowler flaps. A fairing is a structure used to reduce drag (e.g., parasitic drag) by covering gaps or spaces or protrusions of structural features that extend into an oncoming wind stream. For example, a fairing may cover a mechanism that protrudes beyond a wing surface, where the mechanism supports the flap in either a stowed or a deployed orientation. For example, the Fowler flap may include an actuation system such as a multi-bar linkage, an external cantilever track, a deep hinge support mechanism, etc., which is unable to be stowed in a cavity or a cove of the aircraft wing and, thus, requires one or more fairings to cover one or more components of the actuation system. For example, the actuation system may include one or more complex assemblies to achieve a desired path of motion of the Fowler flap. However, the use of fairings increases manufacturing assembly complexity due to increased components and reduces operational efficiency of the aircraft by generating parasitic drag if the fairings protrude into the wind stream.

Example high-fowler flap actuation apparatus and related methods disclosed herein are operative to deploy a flap operatively coupled to an aircraft such as a Fowler flap via a linear drive actuation system. As used herein, the terms "high-fowler flap actuation apparatus" and "high-fowler flap actuation system" are used interchangeably and refer to one or more Fowler flaps or Fowler flap assemblies which, when actuated, extend the one or more Fowler flaps or the Fowler flap assemblies a relatively large distance (e.g., extends approximately as far as a chord-wise length of a flap) away from a main portion of the aircraft wing.

In some disclosed examples, the high-fowler flap actuation apparatus includes one or more support arms (e.g., five support arms) and one or more drive arms (e.g., two drive arms) that are structurally independent from each other. For example, the one or more support arms may not be coupled to one or more of the drive arms. For example, a first end of a support arm may be coupled to a main wing portion of an aircraft at a first coupling location while a second end of the support arm may be coupled to a Fowler flap at a second coupling location. In such an example, a first end of the drive arm may be operatively coupled to the main wing portion of the aircraft at a third coupling location while a second end of the drive arm may be coupled to the Fowler flap at a fourth coupling location. In such an example, the first and the third coupling locations and the second and the fourth coupling locations may be different.

In some disclosed examples, the one or more support arms and the one or more drive arms are operative to move the Fowler flap from a first position (e.g., a retracted position, a stowed position, etc.) to a second position (e.g., a deployed position, an extended position, an intermediate position, etc.) via linear motion of the one or more support arms and the one or more drive arms. For example, the drive arm may be a scissor drive linkage including a linear actuator. As used herein, the term "linear motion" refers to a movement of one or more components based on the one or more components and/or one or more related components moving along a direction or a path defined by a straight line. For example, a first universal joint of a drive arm may move relatively perpendicular to a second universal joint of the drive arm as the high-fowler flap actuation apparatus deploys the trailing-edge flap from a stowed position to a deployed position.

In some disclosed examples, the drive arm is coupled to the main wing portion, the Fowler flap, etc., by a pivot bracket or a pivot support, a universal joint such as a ball joint, etc. By eliminating complex actuation assemblies such as multi-bar linkages, external cantilever tracks, deep hinge supports, etc., the high-fowler flap actuation apparatus and related methods disclosed herein decrease parasitic drag by reducing and/or eliminating external fairings from the aircraft wings. The disclosed example high-fowler flap actuation apparatus decreases parasitic drag due to the example high-fowler flap actuation apparatus fitting in the cove of the aircraft wing when stowed.

FIG. 1 is an isometric view of an example high-fowler flap actuation system 100 coupled to an example aircraft 102 to implement the examples disclosed herein. In the illustrated example, the aircraft 102 includes first and second wings 104, 106 coupled to a fuselage 108. First and second engines 110, 112 are coupled to the wings 104, 106. First through fourth slats 114, 116, 118, 120, first and second leading-edge flaps 122, 124, and first through fourth trailing-edge flaps 126, 128, 130, 132 are operatively coupled to the wings 104, 106. In the illustrated example, the leading-edge flaps 122, 124 are Krueger flaps. In the illustrated example, the trailing-edge flaps 126, 128, 130, 132 are Fowler flaps (e.g., high-Fowler flaps) and are operatively coupled to a main portion of the wings 104, 106. In the illustrated example, wing trailing-edge lower and upper panels 133, 135 (e.g., lower cove panel 133, upper cove panel 135, etc.) of the trailing-edge flaps 126, 128, 130, 132 have been made transparent.

Additional aircraft control surfaces of the aircraft include first and second ailerons 134, 136, first and second elevators 138, 140 operatively coupled to first and second horizontal stabilizers 142, 144, and a rudder 146 operatively coupled to a vertical stabilizer 148.

In the illustrated example of FIG. 1, the first through the fourth trailing-edge flaps 126, 128, 130, 132 are in a deployed position. For example, each of the first through the fourth trailing-edge flaps 126, 128, 130, 132 may be extended from a retracted position to the deployed position via a corresponding one of the high-fowler flap actuation systems 100. For example, the deployed position may include the first through the fourth trailing-edge flaps 126, 128, 130, 132 to be fully extended away from the wings 104, 106. In such an example, the first through the fourth trailing-edge flaps 126, 128, 130, 132 may be extended at a distance approximately as far as a chord-wise length of the trailing-edge flaps 126, 128, 130, 132. While the functions of the example high-fowler flap actuation systems 100 described below are described in the singular form, the described functionality applies to all of the high-fowler flap actuation systems 100.

In the illustrated example, the first and the second trailing-edge flaps 126, 128 are each operatively coupled to the main wing portion of the first wing 104 via (1) a first through fifth support arms 150, 152, 154, 156, 158 and a first and a second drive arm 160, 162. In the illustrated example, the third and the fourth trailing-edge flaps 130, 132 are each operatively coupled to the main wing portion of the first wing 104 via (1) the first through fifth support arms 150, 152, 154, 156, 158 and the first and the second drive arms 160, 162.

In the illustrated example, the first through the fifth support arms 150, 152, 154, 156, 158 support the first trailing-edge flap 126 while the first and the second drive arms 160, 162 drive, extend, push, etc., the first trailing-edge flap 126 from the retracted position to the deployed position via linear motion. For example, a leading edge 164 of the trailing-edge flaps 126, 128, 130, 132 may move relatively perpendicular to a spar 166 (e.g., a rear spar 166) of the wings 104, 106 as the high-fowler flap actuation system 100 deploys the trailing-edge flaps 126, 128, 130, 132 from a stowed position to a deployed position or a position in between the stowed position and the deployed position. In such an example, the leading-edge 164 may move relatively perpendicular to the rear spar 166 as a trailing-edge 168 of the trailing-edge flaps 126, 128, 130, 132 moves in a fowler direction or motion (e.g., sliding backwards (e.g., opposite the path of travel of the aircraft) before hinging in a downward direction).

Figure 2:
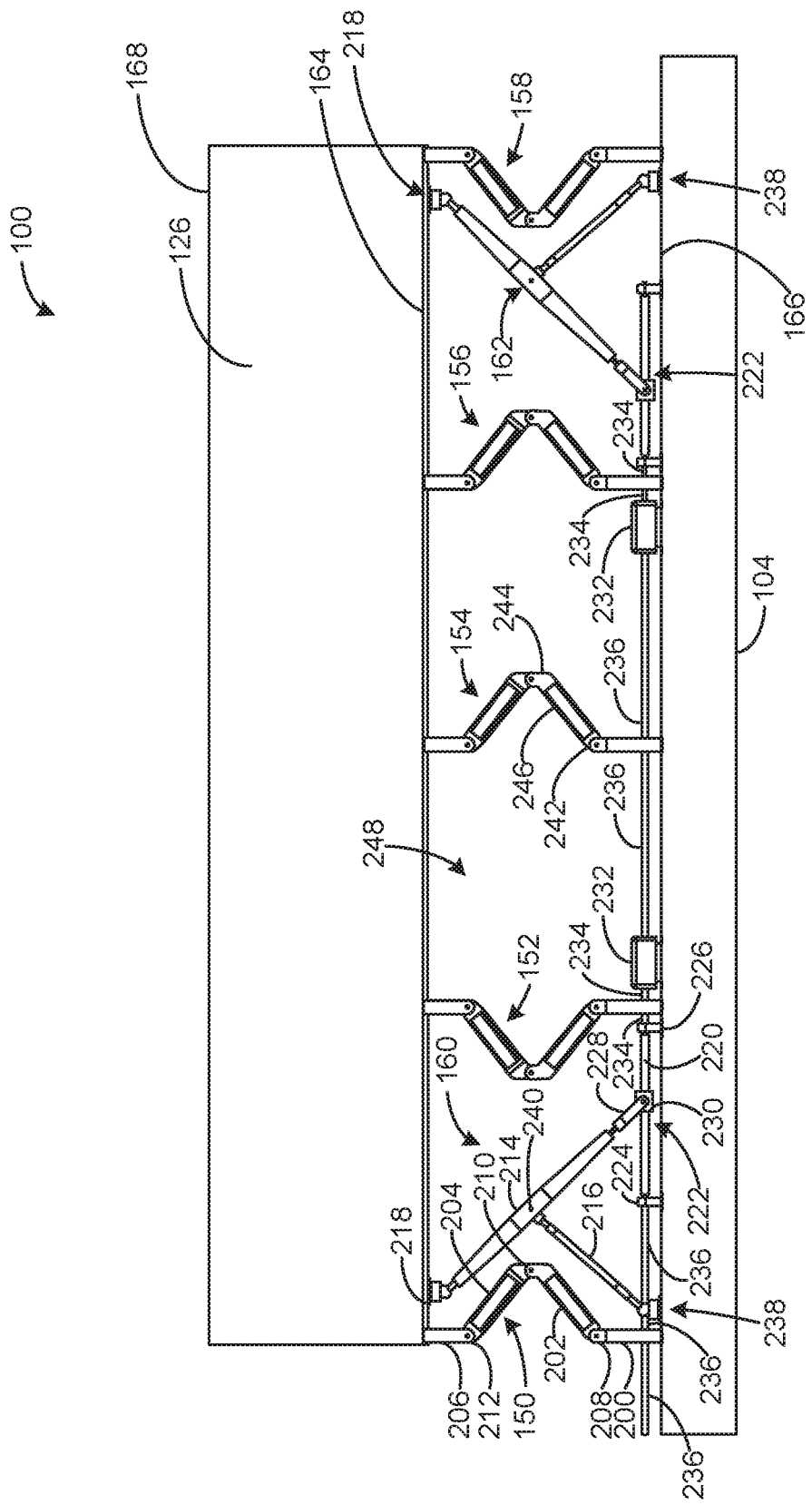
FIG. 2 is a plan view of the example high-fowler flap actuation apparatus of FIG. 1.

FIG. 2 is a plan view of the first trailing-edge flap 126 of FIG. 1 operatively coupled to the main portion of the first wing 104 of FIG. 1 via the example high-fowler flap actuation system 100 of FIG. 1. While the functions and/or structures of the example high-fowler flap actuation system 100 described below in connection with FIG. 2 are described in connection with the first trailing-edge flap 126, the described functionality and/or structures apply to all high-fowler flap actuation systems 100 in connection with the second through the fourth trailing-edge flaps 128, 130, 132 of FIG. 1. For clarity purposes, the example lower and upper cove panels 133, 135 of FIG. 1 have been removed.

In the illustrated example of FIG. 2, the first-trailing edge flap 126 is in an intermediate position. For example, the first-trailing edge flap 126 is between a stowed position and a deployed position. In the illustrated example, the high-fowler flap actuation system 100 includes the first through the fifth support arms 150, 152, 154, 156, 158 of FIG. 1. Each of the support arms 150, 152, 154, 156, 158 in the illustrated example includes first through fourth bodies (e.g., structural members, support members, etc.) 200, 202, 204, 206 to support the first trailing-edge flap 126 as the first trailing-edge flap 126 moves from the stowed position, the intermediate position, etc., to the deployed position. Additionally or alternatively, the first through the fourth example support members 200, 202, 204, 206 may be used to control a location, a position, etc., of the first trailing-edge flap 126 as the first trailing-edge flap 126 extends or retracts. Similarly, the first through the fourth support members 200, 202, 204, 206 may be used to support the first trailing-edge flap 126 as the first trailing-edge flap 126 returns the first trailing-edge flap 126 from the deployed position to the intermediate position, the stowed position, etc.

In the illustrated example, the first and the fourth support members 200, 206 are fixed support members that are anchored in place via one or more fasteners (e.g., rivets, bolts, etc.), brackets, structural bonds, etc., and/or a combination thereof. For example, the first support member 200 may be fixably coupled to the first wing 104 via a non-movable bracket or any other fixed support mechanism. Likewise, the fourth support member 206 may be fixably coupled to the first trailing-edge flap 126 via one or more non-movable brackets or any other fixed support mechanism.

In the illustrated example, the second and the third support members 202, 204 are pivotable support members used to support the first trailing-edge flap 126 when the first trailing-edge flap 126 is retracted and/or extended with respect to the first wing 104. For example, the second and the third support members 202, 204 pivot about their respective coupling connections to support a retraction and/or an extension of the first trailing-edge flap 126 with respect to the first wing 104. The second support member 202 of the illustrated example is operatively coupled to the first support member 200 and the third support member 204. In the illustrated example, the second support member 202 is pivotably coupled (e.g., rotatably mountable) to the first support member 200 via a first pivot hinge 208. In the illustrated example, the second support member 202 is pivotably coupled to the third support member 204 via a second pivot hinge 210. In the illustrated example, the second support member 202 is pivotably rotatable about the first and the second pivot hinges 208, 210.

The third support member 204 of the illustrated example is operatively coupled to the second support member 202 and the fourth support member 206. In the illustrated example, the third support member 204 is pivotably coupled to the fourth support member 206 via a third pivot hinge 212. In the illustrated example, the third support member 204 is pivotably rotatable about the second and the third pivot hinges 210, 212.

In the illustrated example, the first through the fourth support members 200, 202, 204, 206 are hybrid material support arms which include both metallic and non-metallic mechanical structures. Alternatively, the first through the fourth support members 200, 202, 204, 206 may be made from a single metallic or non-metallic material such as aluminum, carbon fiber, titanium, etc. For example, the first support member 200 may be made entirely of titanium. In the illustrated example, a first end 242 and a second end 244 of the second support member 202 are joint ends made from titanium. Alternatively, the joint ends at the first and the second ends 242, 244 may be made from any other metal or metallic alloy such as aluminum, stainless steel, etc., and/or a combination thereof. In the illustrated example, an arm section 246 of the second support member 202 is made from carbon fiber. Alternatively, the arm section 246 may be made from any other non-metallic material such as a ceramic material, a plastic material, etc., and/or a combination thereof.

In the illustrated example of FIG. 2, the high-fowler flap actuation system 100 includes the first and the second drive arms 160, 162 of FIG. 1. While the functions and/or structures of the example drive arms 160, 162 described below are described in connection with the first example drive arm 160, the described functionality and/or structures also apply to the second drive arm 162. The first drive arm 160 of the illustrated example is operative to move the first trailing-edge flap 126 from a first position (e.g., a retracted position) to a second position (e.g., a deployed position) via linear motion. For example, the first drive arm 160 may move along a path (e.g., from the stowed position to the deployed position) defined by a straight line. In such an example, the first drive arm 160 includes components that move relatively parallel (e.g., parallel or parallel within a tolerance of 1 degree, 3 degrees, etc.) to the rear spar 166 and relatively perpendicular to the rear spar 166 as the first trailing-edge flap 126 moves in a fowler motion when moving from a stowed position to a deployed position.

In the illustrated example, the first trailing-edge flap 126 is supported by the first through the fifth support arms 150, 152, 154, 156, 158 while the first and the second drive arms 160, 162 extend or retract the first trailing-edge flap 126. In the illustrated example, the first and the second drive arms 160, 162 are not coupled to any of the first through the fifth example support arms 150, 152, 154, 156, 158. In the illustrated example, the first and the second drive arms 160, 162 are independent from the first through the fifth example support arms 150, 152, 154, 156, 158.

In the illustrated example, the first drive arm 160 is a scissor linkage (e.g., a criss-cross actuator). For example, the scissor linkage uses linked, folding supports in a criss-cross 'X' pattern to extend a body from a first position to a second position by applying a force to an outside portion of a set of supports at one end of the scissor linkage. The first drive arm 160 of the illustrated example includes a first linear body 214 and a second linear body 216. The first linear body 214 of the illustrated example is a linear drive arm such as a beam that includes a first end and a second end to linearly move the first-trailing edge flap 126 from a first position to a second position. The first end of the first linear body 214 of the illustrated example is operatively coupled to the first trailing-edge flap 126 via a first universal joint 218 such as a ball joint. Alternatively, the first end of the first example linear body 214 may be operatively coupled to the first example trailing-edge flap 126 via any other movable coupling attachment mechanism providing a substantially similar range of motion compared to the first universal joint 218.

In the illustrated example, the first drive arm 160 includes the second end of the first linear body 214 to be operatively coupled to the first wing 104 via a third linear body 220 that includes a first end and a second end. The second end of the first linear body 214 of the illustrated example is operatively coupled to the third linear body 220 via a pivotably movable bracket 222. Alternatively, the second end of the first example linear body 214 may be operatively coupled to the third example linear body 220 via any other pivotably and/or movable coupling attachment mechanism. Alternatively, the first through the third linear bodies 214, 216, 220 may have alternate geometries and/or shapes. For example, the first through the third linear bodies 214, 216, 220 may be characterized by cross-sectional areas, densities, materials, etc., that may be substantially similar or dissimilar from each other.

The third linear body 220 of the illustrated example is a mechanical linear actuator such as a ball screw drive shaft (e.g., a ball screw rod, a thread-less ball screw drive rod, etc.) that includes a first end and a second end to support a linear motion of the pivotably movable bracket 222. Alternatively, the third example linear body 220 may be a rod where the pivotably movable bracket 222 may slide along the third linear body 220. For example, the pivotably movable bracket 222 may be slidably coupled to the third linear body 220. The third linear body 220 of the illustrated example is fixably coupled to the first wing 104. In the illustrated example, the third linear body 220 is mountably coupled to the first wing 104 via a first attachment support 224 at the first end of the third linear body 220 and a second attachment support 226 at the second end of the third linear body 220. For example, the first and the second attachment supports 224, 226 may be mountably coupled to the main portion of the first wing 104 via one or more fasteners (e.g., one or more bolts, nuts, rivets, screws, washers, etc., and/or a combination thereof), attachment mechanisms, bracket supports, etc., and/or a combination thereof.

In the illustrated example, the pivotably movable bracket 222 includes a first pivot support 228 coupled to a movable member 230. The first pivot support 228 of the illustrated example enables the first linear body 214 to pivot about the pivotably movable bracket 222 (e.g., rotate upwards, rotate downwards, etc., with respect to the pivotably movable bracket 222) when the first trailing-edge flap 126 is moved from a first position to a second position. For example, the first linear body 214 may move linearly from a first position to a second position due to a motion enabled by the pivotably movable bracket 222. For example, as the first trailing-edge flap 126 extends from a stowed position to a deployed position, the pivotably movable bracket 222 may move along the third linear body 220 while pivoting about the first pivot support 228.

The movable member 230 of the illustrated example is a drive shuttle such as a ball nut. The movable member 230 of the illustrated example can be actuated, moved, etc., from a first position to a second position. For example, the first position may include the movable member 230 to be located at the first end of the third linear body 220. In another example, the second position may include the movable member 230 to be located at the second end of the third linear body 220, the first end opposite the second end.

In the illustrated example, the movable member 230 can be moved from the first position to the second position via an actuator 232. For example, the actuator 232 may be a drive mechanism such as a motor (e.g., an electric motor, a hydraulic motor, an electro-hydraulic motor, etc.), a gear box, etc., rotatably and/or movably coupled to an actuator shaft 234 (e.g., a rotatable shaft, a rotatable actuation shaft, etc.). In such an example, the actuator 232 may be activated or engaged to rotate the actuator shaft 234 to move the movable member 230 from the first position to the second position and, as a result, extend the first trailing-edge flap 126 from a first position to a second position (e.g., via an extension of the first linear body 214). In the illustrated example, a flap drive motor shaft 236 operatively couples together the actuator shafts 234 to help ensure that the actuators 232 actuate, move, operate, etc., at the same or substantially similar rate.

In the illustrated example, the second linear body 216 is a linear drive arm such as a rod that includes a first end and a second end to drive, guide, and/or support a motion of the first linear body 214. The first end of the second linear body 216 of the illustrated example is operatively coupled to a second universal joint 238 such as a ball joint. The second end of the second linear body 216 of the illustrated example is operatively coupled to an approximate midpoint of the first linear body 214 via a third universal joint 240 such as a ball joint. Alternatively, the second end of the second example linear body 216 may be operatively coupled to any other location of the first example linear body 214 via any other type of movable coupling attachment mechanism.

In the illustrated example, the second universal joint 238 is a pivotable support that anchors a pivot point of the first end of the second linear body 216. The second universal joint 238 of the illustrated example is fixably coupled to the first wing 104. In the illustrated example, the second universal joint 238 is mountably coupled to the first wing 104 via one or more fasteners (e.g., one or more bolts, nuts, rivets, screws, washers, etc., and/or a combination thereof), attachment mechanisms, bracket supports, etc., and/or a combination thereof. In the illustrated example, the first through the third universal joints 218, 238, 240 are relatively identical (e.g., are the same within a machining tolerance, a mechanical tolerance, etc.). Alternatively, the first through the third universal joints 218, 238, 240 may be different from each other. In the illustrated example, a first centerline of the actuator shaft 234 intersects a second centerline of the second universal joint 238 to achieve linear motion of the high-fowler flap actuation system 100, where the first and the second centerlines run parallel to the rear spar 166.

In connection with the illustrated example of FIG. 2, the structure, function, and/or operation of each of the first example support arm 150 and the first drive arm 160 is/are the same as the corresponding structure, function, and/or operation of the second through the fifth support arms 152, 154, 156, 158 and the second drive arm 162 as described above. Thus, in the interest of brevity, the structure, function, and/or operation of these components and structures of FIG. 2 are not repeated herein.

In the illustrated example, the high-fowler flap actuation system 100 fits within a cavity or a cove 248 of the first wing 104 when in the stowed position. The cove 248 of the illustrated example is defined as an area between (1) the first wing 104 and the first trailing-edge flap 126 and (2) between a top surface of the upper cove panel 135 (not shown) and a bottom surface of the lower cove panel 133 (not shown).

In the illustrated example, one or more external fairings are not needed due to the high-fowler flap actuation system 100 fitting entirely within the cove 248.

Figure 3:
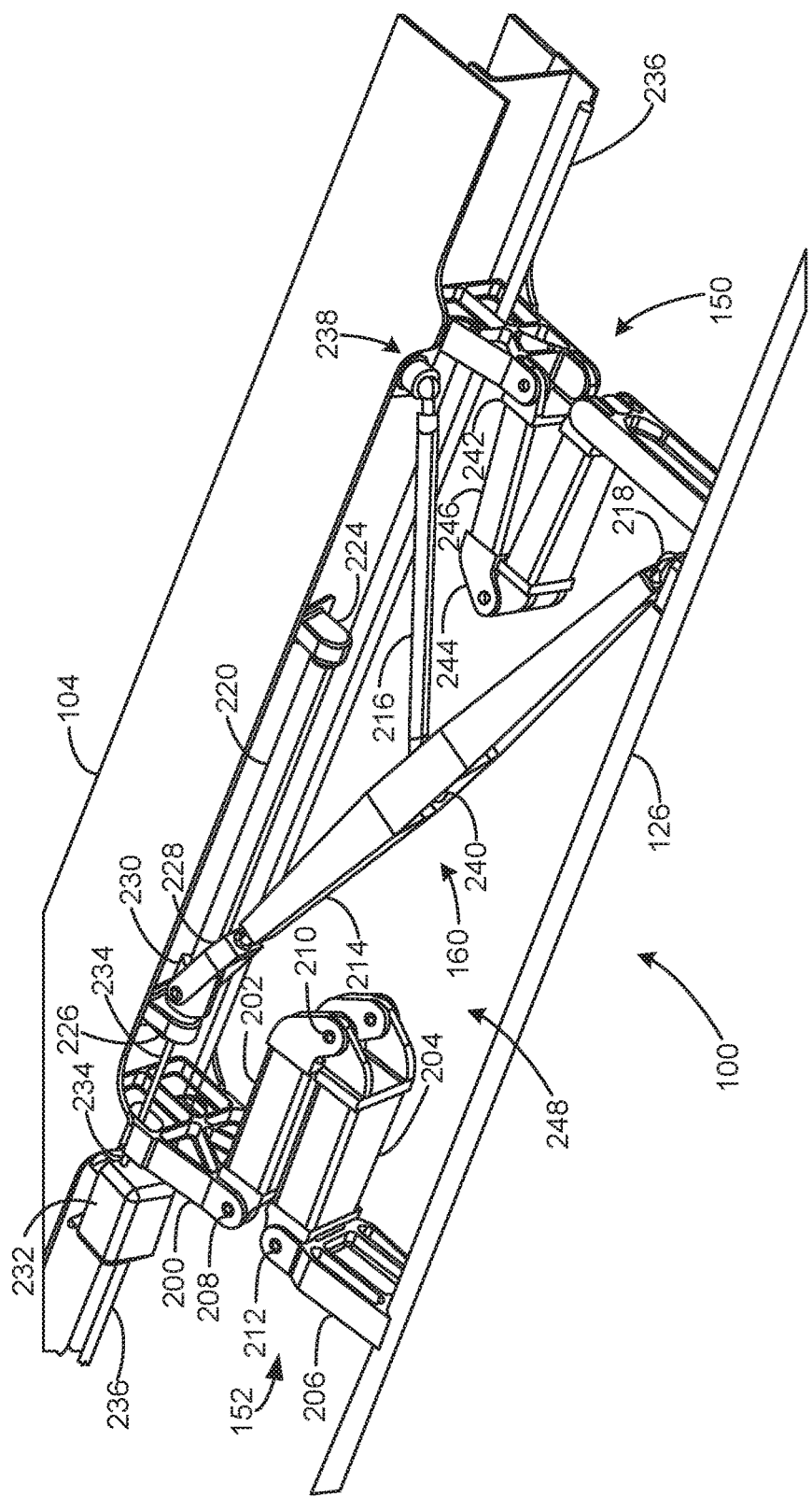
FIG. 3 is an isometric view depicting a detailed portion of example support arms and an example drive arm of the example high-fowler flap actuation apparatus of FIGS. 1-2.

FIG. 3 is an isometric view depicting detailed portions of the first and the second support arms 150, 152 and the first drive arm 160 of FIGS. 1-2. For clarity purposes, the example lower and upper cove panels 133, 135 of FIG. 1 have been removed. In the illustrated example, the first and the second support arms 150, 152, the first drive arm 160, the first trailing-edge flap 126, and corresponding components are in the stowed position. For example, the actuator 232 may be activated to rotate the actuator shaft 234 to engage the movable member 230 to move from the stowed position (e.g., from the first end of the third linear body 220 of FIG. 2) to the deployed position (e.g., to the second end of the third linear body 220). In such an example, as the example movable member 230 moves to the deployed position, the first and the second linear bodies 214, 216 move to the deployed position. As the first and second example linear bodies 214, 216 move to the deployed position, the first and the second support arms 150, 152 support the first example trailing-edge flap 126 as the first trailing-edge flap 126 moves to the deployed position.

Figure 4:
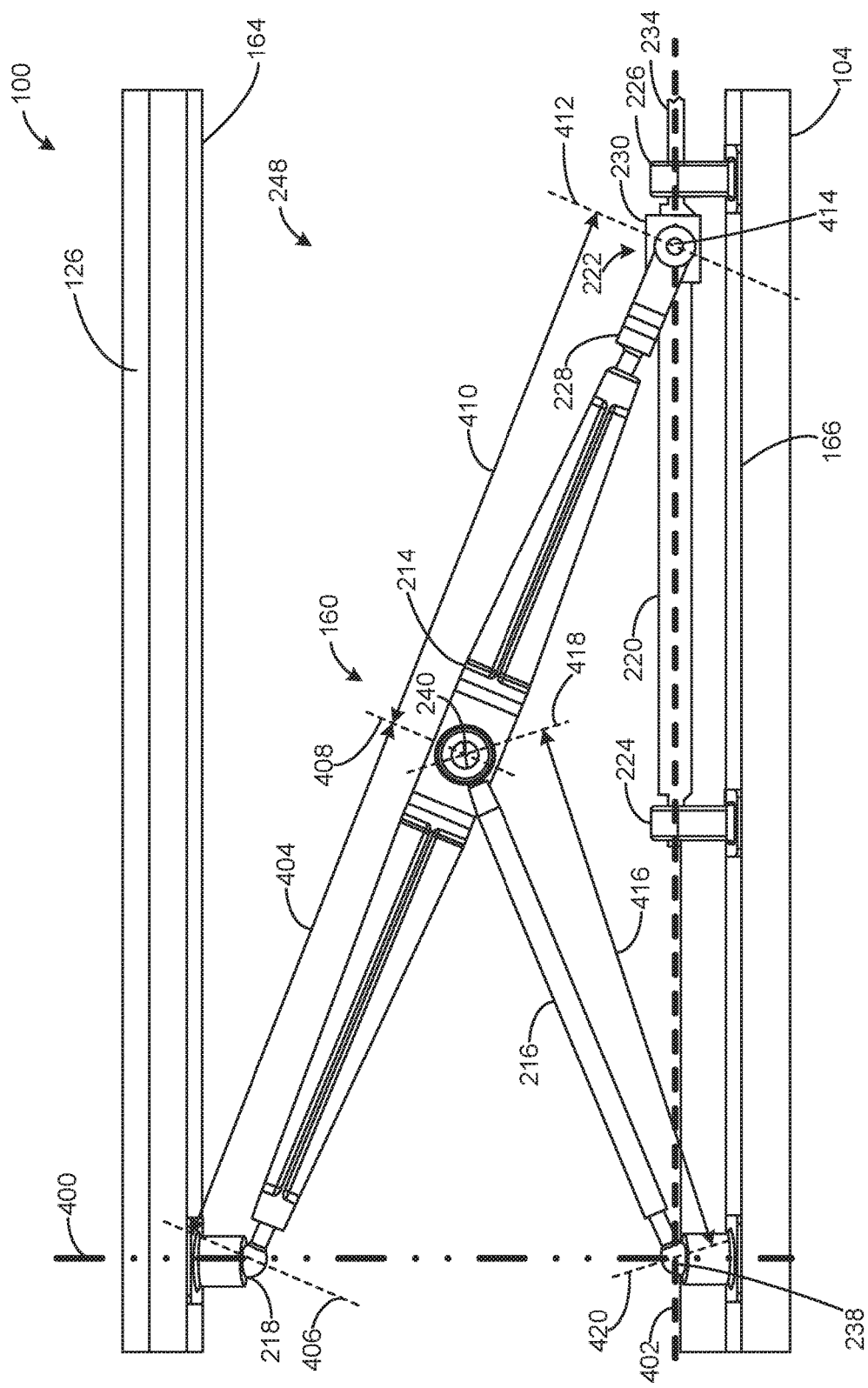
FIG. 4 is a plan view of an example drive arm of the example high-fowler flap actuation apparatus of FIGS. 1-3.

FIG. 4 is a plan view of the first example drive arm 160 of FIGS. 1-3 operatively coupled to the first example trailing-edge flap 126 of FIGS. 1-3 and coupled to the first wing 104 of FIGS. 1-3. For clarity purposes, the example lower and upper cove panels 133, 135 of FIG. 1 have been removed. In the illustrated example, the first drive arm 160 moves (e.g., when actuated) from the stowed position to the deployed position with respect to a first axis 400 and a second axis 402. The first and the second axes 400, 402 of the illustrated example are in the same geometric plane. The first axis 400 of the illustrated example is formed by an imaginary line connecting the first universal joint 218 and the second universal joint 238 of FIGS. 2-3. The second axis 402 of the illustrated example is formed by a second imaginary line connecting the second universal joint 238 and the third linear body 220. In the illustrated example, the first and the second axes 400, 402 are relatively perpendicular (e.g., perpendicular or perpendicular within a tolerance of 1 degree, 3 degrees, etc.) to each other.

In the illustrated example of FIG. 4, the first drive arm 160 moves the first example trailing-edge flap 126 via linear motion due to one or more components of the first drive arm 160 moving along one or both of the first and the second axes 400, 402. In the illustrated example, the first end of the first linear body 214 of FIGS. 2-3 moves along the first axis 400. For example, the first end of the first linear body 214 may move in a direction defined by a straight line along the first axis 400. In the illustrated example, the second end of the first linear body 214 and the movable member 230 move along the second axis 402. In the illustrated example, the first end of the second linear body 216 pivots around a point where the first and the second axes 400, 402 intersect at the second universal joint 238. In the illustrated example, the second end of the second linear body 216 moves along the first and the second axes as the first linear body 214 and the third universal joint 240 move from a first position to a second position (e.g., from a stowed position to a deployed position).

In the illustrated example, the motion path for the first linear body 214 is controlled at the first end of the first linear body 214 by the pivotably movable bracket 222 being driven along the third linear body 220 along the second axis 402. In the illustrated example, the motion path for the third universal joint 240 is driven by the second linear body 216 as the second linear body 216 pivots around the second universal joint 238. In the illustrated example, the linear motion at the first end and the arcing motion (e.g., curving motion, pivoting motion, etc.) at the third universal joint 240 combine to drive the second end of the first linear body 214 in a linear direction along the first axis 400. As the first linear body 214 drives the first trailing-edge flap 126 from a stowed position to a deployed position, the first linear body 214 drops out-of-plane of the first and the second axes 400, 402 to enable the first trailing-edge flap 126 to droop below the wing 104.

In the illustrated example, the first drive arm 160 moves the first trailing-edge flap 126 via linear motion due to lengths (e.g., designed lengths) of the first and the second linear bodies 214, 216. For example, a first length 404 may be defined as a first distance between (1) a first centerline 406 of the first universal joint 218 and (2) a second centerline 408 intersecting a midpoint of the first linear body 214. In such an example or another example, a second length 410 may be defined by a second distance between (1) the second centerline 408 intersecting the midpoint of the first linear body 214 and (2) a third centerline 412 intersecting a first coupling point 414 of the pivotably movable bracket 222.

In the illustrated example, the midpoint of the first linear body 214 is defined as half the distance between the first universal joint 218 and the first mounting point 414. In such an example, a third length 416 may be defined by a third distance between (1) a fourth centerline 418 intersecting the midpoint of the first linear body 214 and (2) a fifth centerline 420 intersecting the second universal joint 238. In the illustrated example, the first length 404, the second length 410, and the third length 416 are relatively equal (e.g., equal or equal within a tolerance of 0.1 millimeters, 0.5 millimeters, etc.). Due to the first through the third lengths 404, 410, 416 being relatively equal in the illustrated example, the first drive arm 160 moves the first trailing-edge flap 126 from a first position to a second position via linear motion of the first drive arm 160. For example, the first universal joint 218 may move relatively perpendicular away from the second universal joint 238 as the first drive arm 160 moves the first trailing-edge flap 126 from the stowed position to the deployed position. In such an example, the pivotably movable bracket 222 rotates about the second axis 402 to enable the first trailing-edge flap 126 to droop below the wing 104 via camber motion as the linear drive arm 160 linearly extends the first universal joint 218 away from the second universal joint 238, extending the first trailing-edge flap 126 in a Fowler motion.

Figure 5:
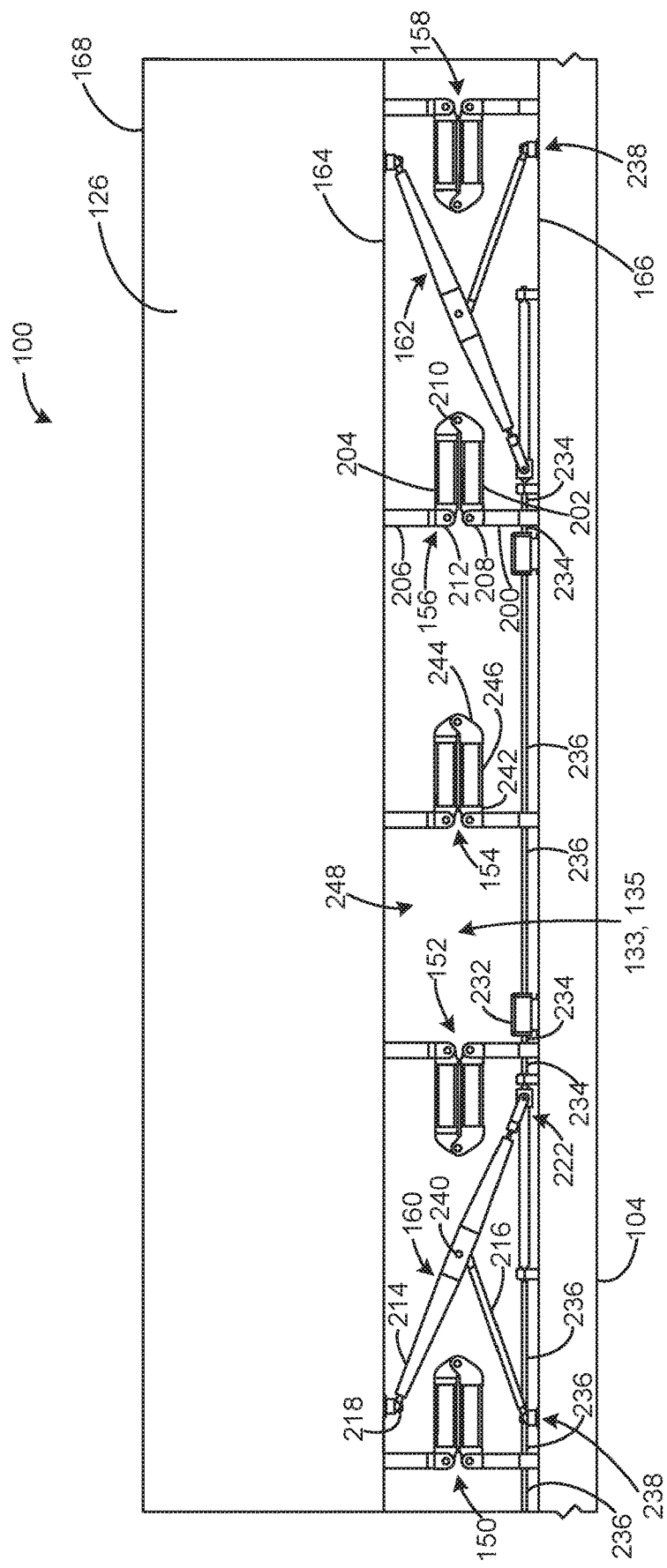
FIG. 5 is a plan view of the example high-fowler flap actuation apparatus of FIGS. 1-4 in a stowed position to implement the examples disclosed herein.

FIG. 5 is a plan view of the example high-fowler flap actuation system 100 of FIGS. 1-4 to implement the examples disclosed herein. In the illustrated example of FIG. 5, the high-fowler flap actuation system 100 is in the stowed position. For clarity purposes, the example lower and upper cove panels 133, 135 of the first trailing-edge flap 126 of FIG. 1 have been made transparent. In the illustrated example, the high-fowler flap actuation system 100 fits within the cove 248 of the first wing 104 when in the stowed position. The cove 248 of the illustrated example is defined as an area between (1) the first wing 104 and the first trailing-edge flap 126 and (2) between a top surface of the upper cove panel 135 and a bottom surface of the lower cove panel 133 of FIG. 1. In the illustrated example, one or more external fairings are not needed due to the high-fowler flap actuation system 100 fitting entirely within the cove 248.

Figure 6:
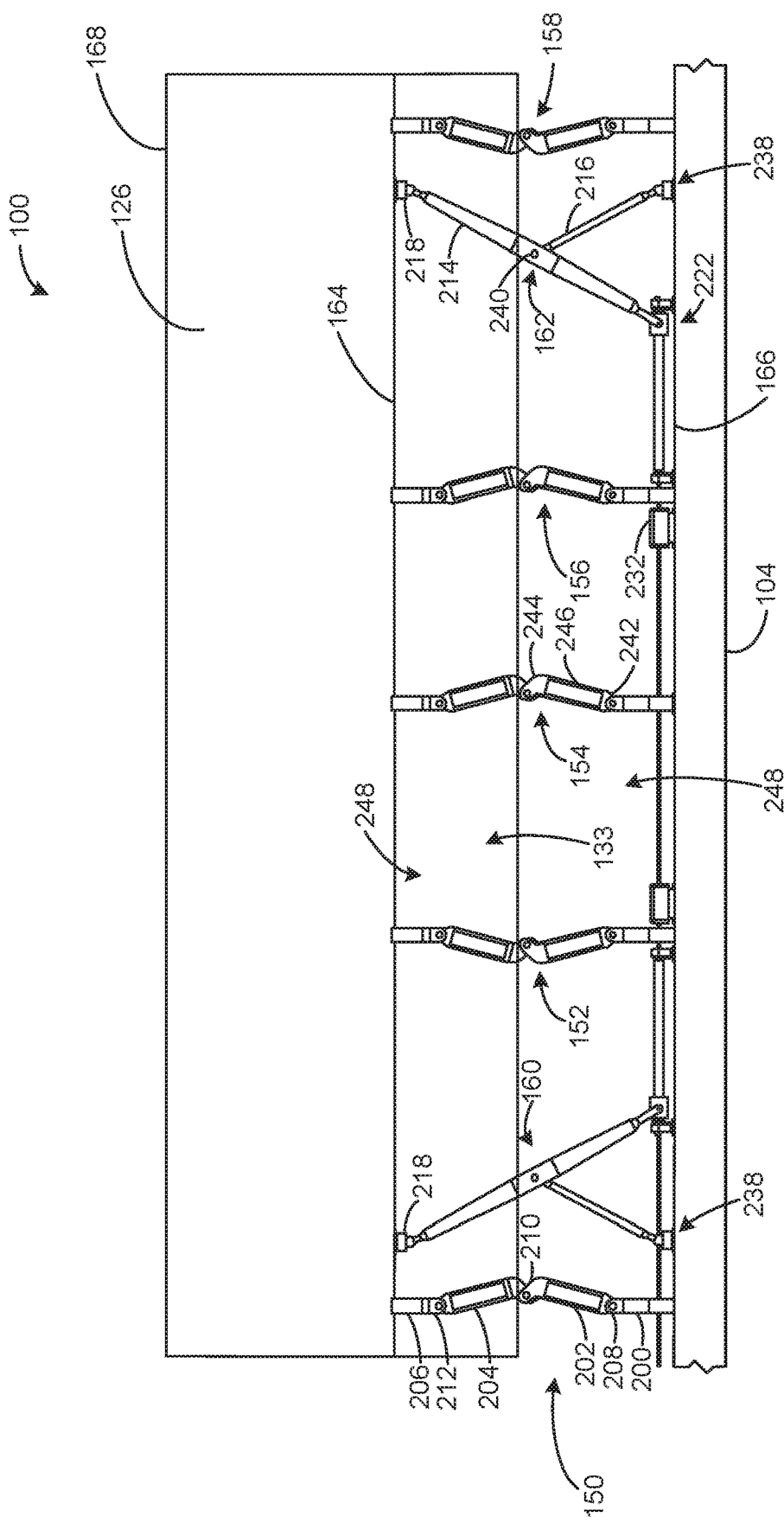
FIG. 6 is a plan view of the example high-fowler flap actuation apparatus of FIGS. 1-5 in a deployed position to implement the examples disclosed herein.

FIG. 6 is a plan view of the example high-fowler flap actuation system 100 of FIGS. 1-5 in the deployed position. For clarity purposes, the example upper cove panel 135 of the first trailing-edge flap 126 of FIG. 1 has been removed and the example lower cove panel 133 of the first trailing-edge flap 126 of FIG. 1 has been made transparent. In the illustrated example, the first trailing-edge flap 126 moves from the stowed position to the deployed position via linear motion based on the first and the second drive arms 160, 162 moving the first universal joints 218 relatively perpendicular away from the second universal joints 238.

Figure 7:
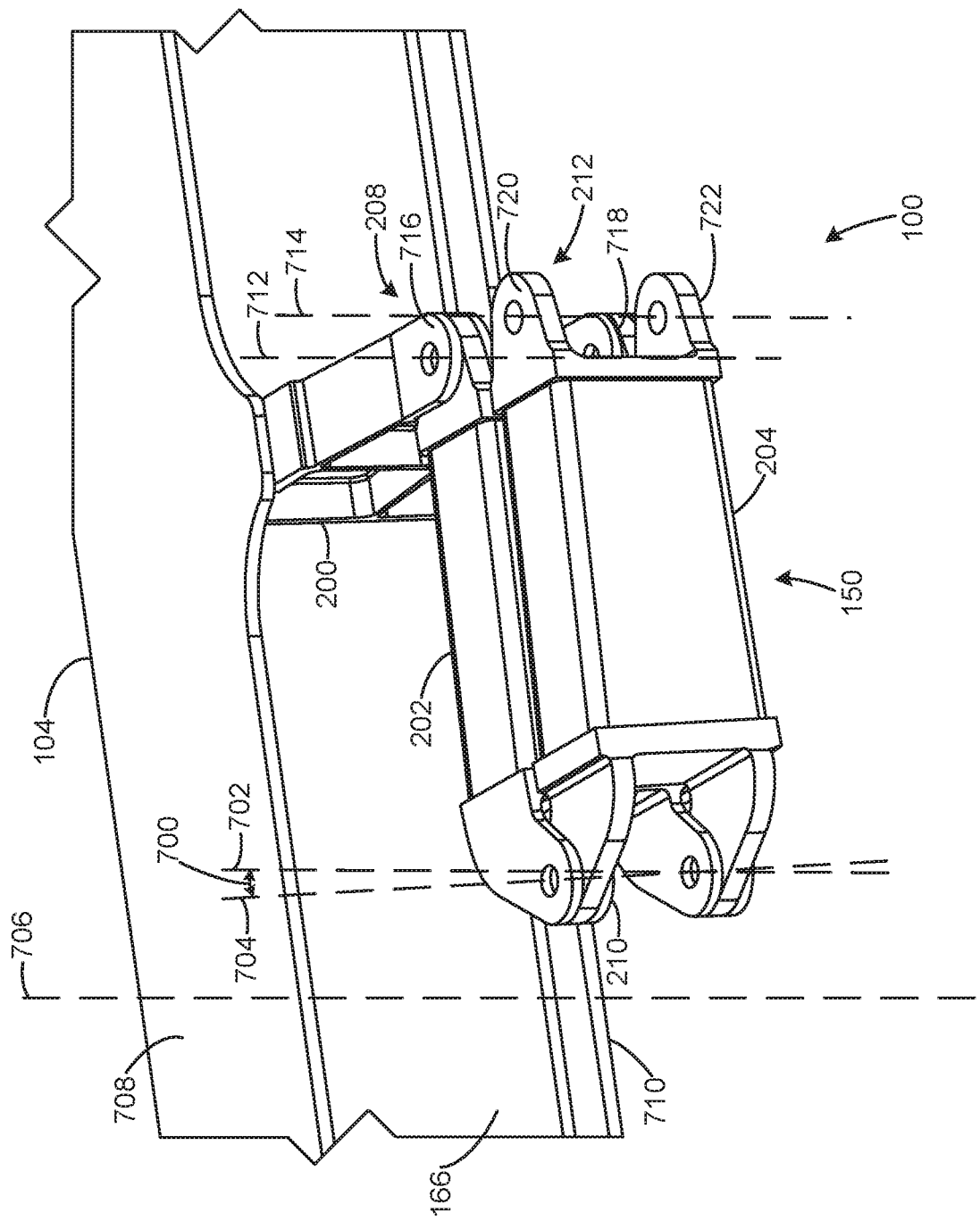
FIG. 7 is an isometric view of a detailed portion of an example support arm of the example high-fowler flap actuation apparatus of FIGS. 1-6.

FIG. 7 is an isometric view of a detailed portion of the first example support arm 150 of FIGS. 1-3 and 5-6 coupled to the first wing 104 of FIGS. 1-6 in the stowed position. In some examples, the high-fowler flap actuation system 100 of FIGS. 1-6 directs an amount of overall camber, curling, drooping, etc., of the trailing-edge flaps 126, 128, 130, 132 based on a camber angle 700. The camber angle 700 of the illustrated example determines an overall camber angle, an overall droop, an overall curling, etc., of the first trailing-edge flap 126 when extended (e.g., fully extended). In the illustrated example, the camber angle 700 is an angle with respect to a first longitudinal axis 702 and a second longitudinal axis 704. The first longitudinal axis 702 of the illustrated example is a first reference vertical axis. The third longitudinal axis 706 of the illustrated example is a second reference vertical axis relatively parallel with a vertical imaginary line connecting an upper wing skin 708 and a lower wing skin 710 of the rear spar 166 of the first wing 104. In the illustrated example, the first support member 200 of the first example support arm 150 is coupled to the rear spar 166. Further details regarding the third longitudinal axis 706 is described below in connection with FIG. 8.

In the illustrated example, the second longitudinal axis 704 is offset from the first longitudinal axis 702 via the camber angle 700. In some examples, a desired amount of camber motion of one or more of the trailing-edge flaps 126, 128, 130, 132 of FIG. 1 can be determined based on adjusting, configuring, generating, etc., the camber angle 700. For example, by configuring a coupling of the second support member 202 with respect to the third support member 204 of FIGS. 1-6 to generate the camber angle 700, a desired amount of flap camber can be achieved. For example, an amount of camber of the first trailing-edge flap 126 may increase as the camber angle 700 is increased.

Further shown in the illustrated example is a fourth longitudinal axis 712 relatively parallel to a fifth longitudinal axis 714 when the first support arm 150 is in the stowed position. Alternatively, the fourth and the fifth example longitudinal axes 712, 714 may not be relatively parallel to each other when the first example support arm 150 is in the stowed position. In the illustrated example, the fourth longitudinal axis 712 is a reference vertical axis relatively parallel with a vertical imaginary line connecting a top surface 716 and a bottom surface 718 of the first pivot hinge 208. In the illustrated example, the fifth longitudinal axis 714 is a vertical axis relatively parallel with a vertical imaginary line connecting a top surface 720 and a second surface 722 of the third pivot hinge 212. The first longitudinal axis 702 of the illustrated example is relatively parallel to the fourth and the fifth longitudinal axes 712, 714.

Figure 8:
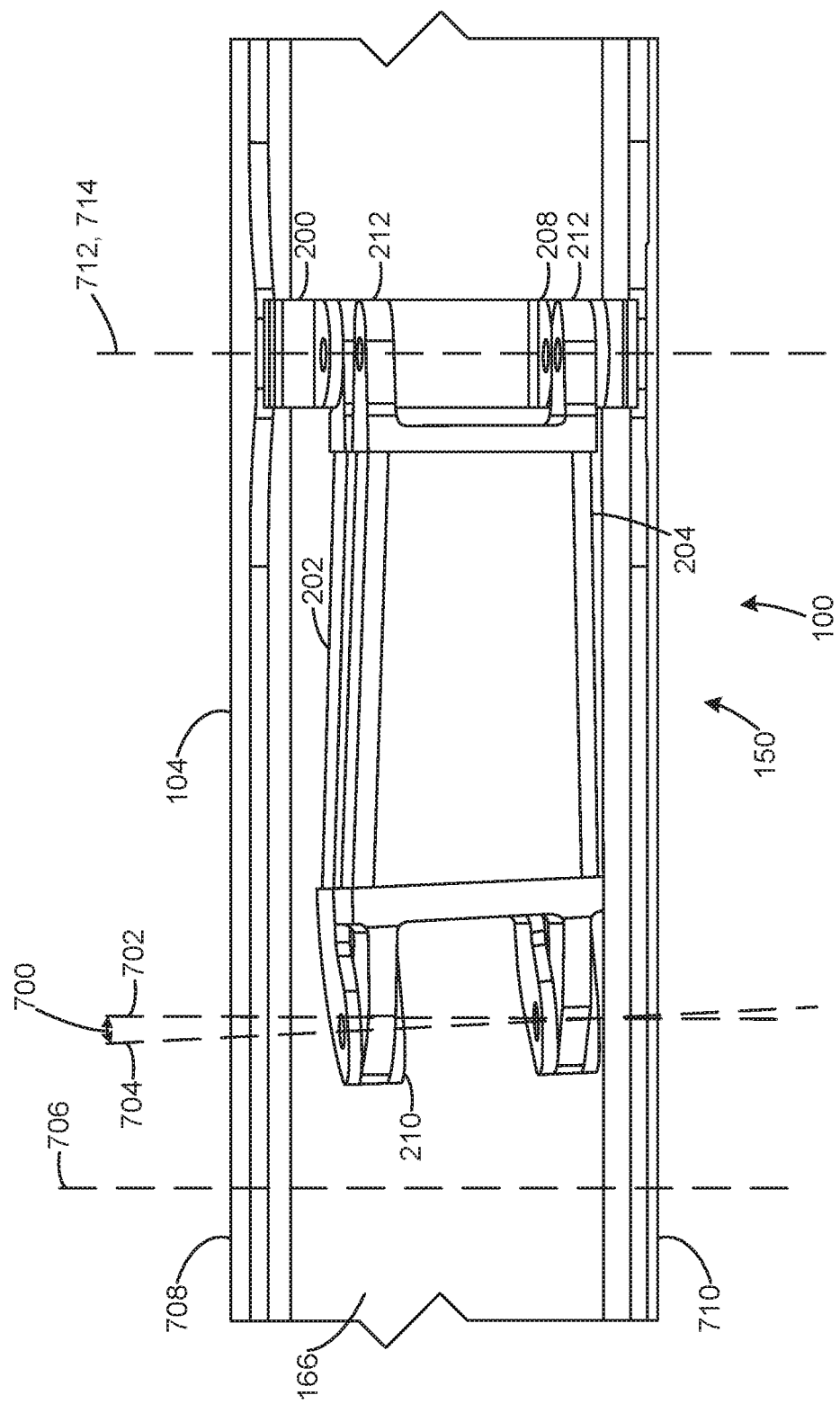
FIG. 8 is a front view of the detailed portion of FIG. 7 of the example support arm of the example high-fowler flap actuation apparatus of FIGS. 1-6.

FIG. 8 is a front view of the detailed portion of FIG. 7 of the first example support arm 150 of FIGS. 1-3 and 5-7 coupled to the first wing 104 of FIGS. 1-7 in the stowed position. In the illustrated example, the camber angle 700 is the angle with respect to the first longitudinal axis 702 and the second longitudinal axis 704 of FIG. 7. In the illustrated example, a coupling of the second and the third support members 202, 204 generates the camber angle 700. For example, a form or a shape of the second and/or the third support members 202, 204 and the coupling of the second and the third support members 202, 204 may cause, generate, induce, etc., the camber angle 700.

FIG. 9A is a front view of the example second support member 202 of FIGS. 2-3 and 5-8. In the illustrated example, the second support member 202 is configured to generate the camber angle 700 of FIGS. 7-8. In the illustrated example, the camber angle 700 is an angle with respect to a horizontal axis 900 and a top surface 902 of the second end 244 of the support member 202 of FIGS. 2-3 and 5-8. For example, a camber angle is based on an angle at which an end of a support member is coupled to an arm section of the support member.

Figure 9:
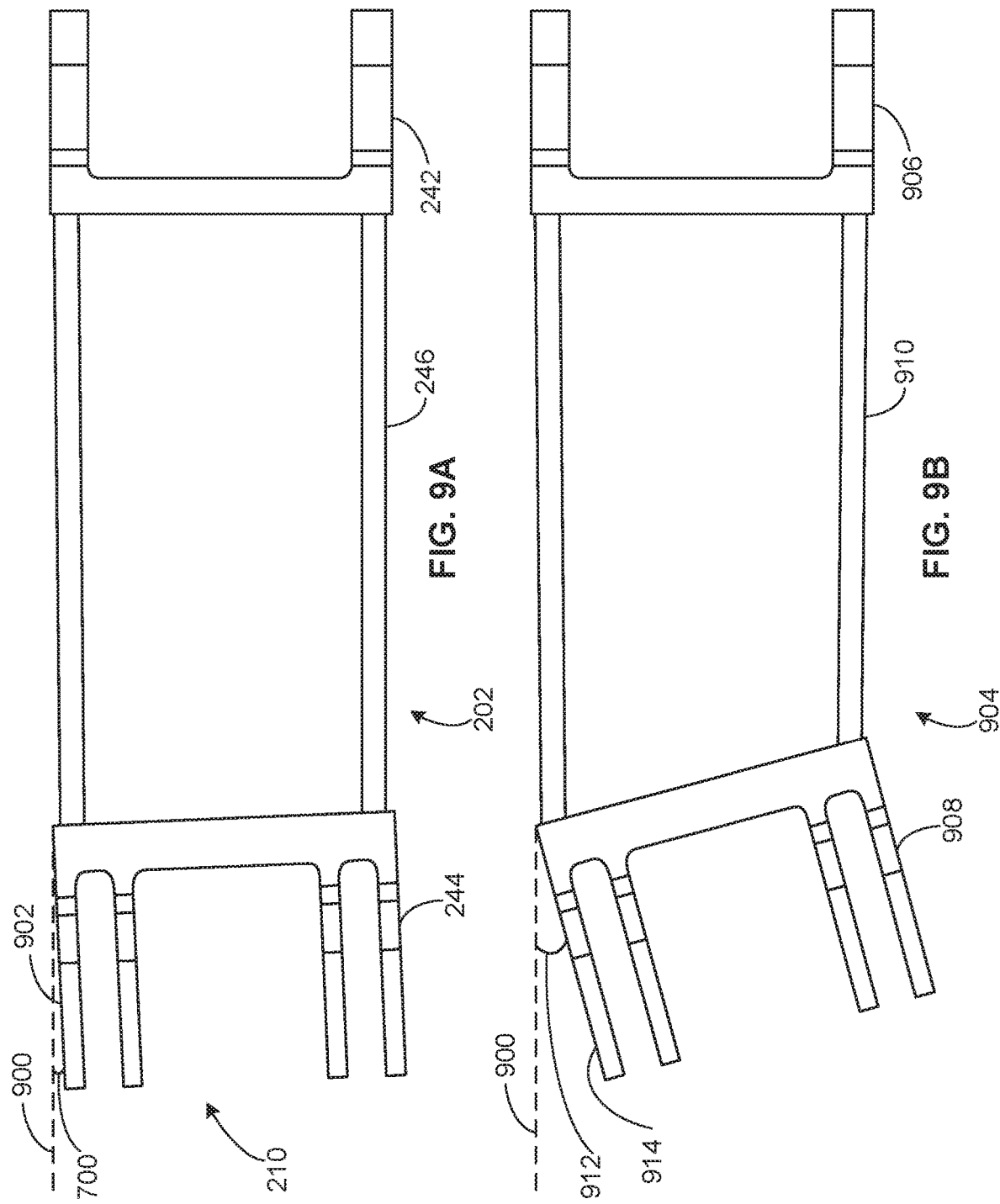
FIG. 9A is a front view of an example support arm including a camber angle.
FIG. 9B is a front view of another example support arm including another camber angle.

FIG. 9B is a front view of a fifth example support member 904. In the illustrated example, the fifth support member 904 includes a first end 906, a second end 908, and an arm section 910 connecting the first and the second ends 906, 908. The first and the second ends 906, 908 are lugs to be used to form pivot hinges by coupling with other support members. The first and the second ends 906, 908 and the arm section 910 may be made from a metallic material or a non-metallic material. For example, the first and the second ends 906, 908 may be made of titanium while the arm section 910 may be made from carbon fiber. The fifth example support member 904 of the illustrated example is configured, formed, structured, etc., to generate another example camber angle 912. The camber angle 912 of FIG. 9B is an angle with respect to a top surface 914 of the fifth example support member 904 and the horizontal axis 900. The camber angle 912 of FIG. 9B is greater than the camber angle 700 of FIGS. 7-9A based on a coupling angle of the second end 908 of the fifth support member 904 being greater than a coupling angle of the second end 244 of the second support member 202.

Figure 10:
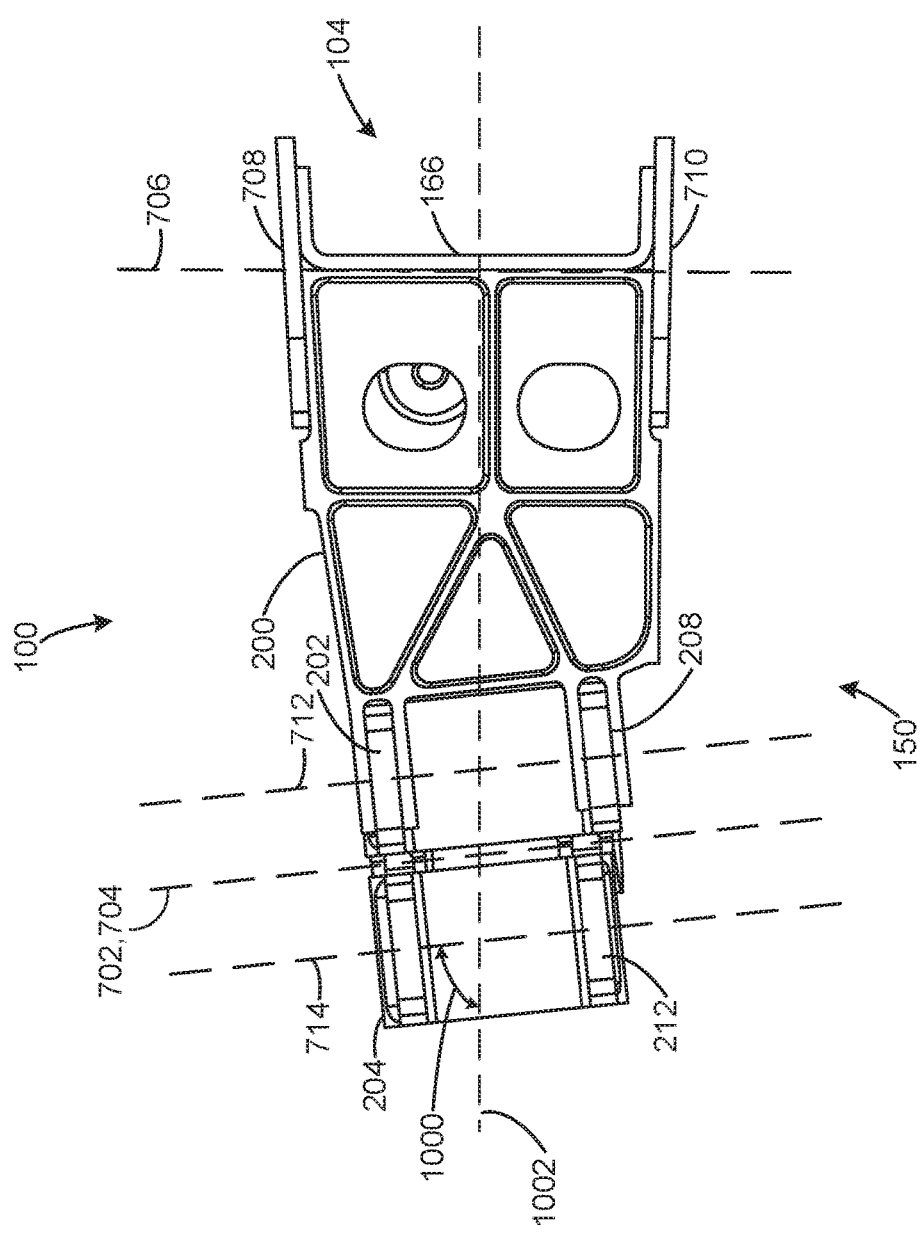
FIG. 10 is an end view of the detailed portion of FIGS. 7-8 of the example support arm of the example high-fowler flap actuation apparatus of FIGS. 1-6 in a stowed position.

FIG. 10 is an end view of the detailed portion of FIGS. 7-8 of the first example support arm 150 of FIGS. 1-3 and 5-8 coupled to the first wing 104 of FIGS. 1-8 in the stowed position. In the illustrated example, the third longitudinal axis 706 as described above is a reference vertical axis relatively parallel with an imaginary line connecting the upper wing skin 708, and the lower wing skin 710 of FIGS. 7-8 where the rear spar 166 interfaces with the first support member 200 of the first support arm 150. In the illustrated example, the first and the second longitudinal axes 702, 704 are relatively parallel to the fourth and the fifth longitudinal axes 712, 714 when the first support arm 150 is in the stowed position. Alternatively, the second, fourth, and fifth longitudinal axes 704, 712, 714 may not be relatively parallel to each other when the first support arm 150 is in the stowed position. In the illustrated example, the camber angle 700 cannot be visualized from this viewing angle and is not explicitly shown.

In the illustrated example, the flap camber of one or more of the trailing-edge flaps 126, 128, 130, 132 of FIG. 1 can be determined based on configuring the coupling of the second and third support members 202, 204, configuring a form or a shape of the second and third support members 202, 204, etc., and/or a combination thereof to generate the camber angle 700. For example, the amount of camber of the first trailing-edge flap 126 may be increased by increasing the camber angle 700. In the illustrated example, a camber stowed angle 1000 is an angle between the fifth longitudinal axis 714 and a horizontal axis 1002. In the illustrated example, the horizontal axis 1002 is a reference horizontal axis relatively perpendicular to the third longitudinal axis 706. In the illustrated example, the horizontal axis 1002 passes through a relative midpoint of a vertical imaginary line between the upper wing skin 708 and the lower wing skin 710.

Figure 11:
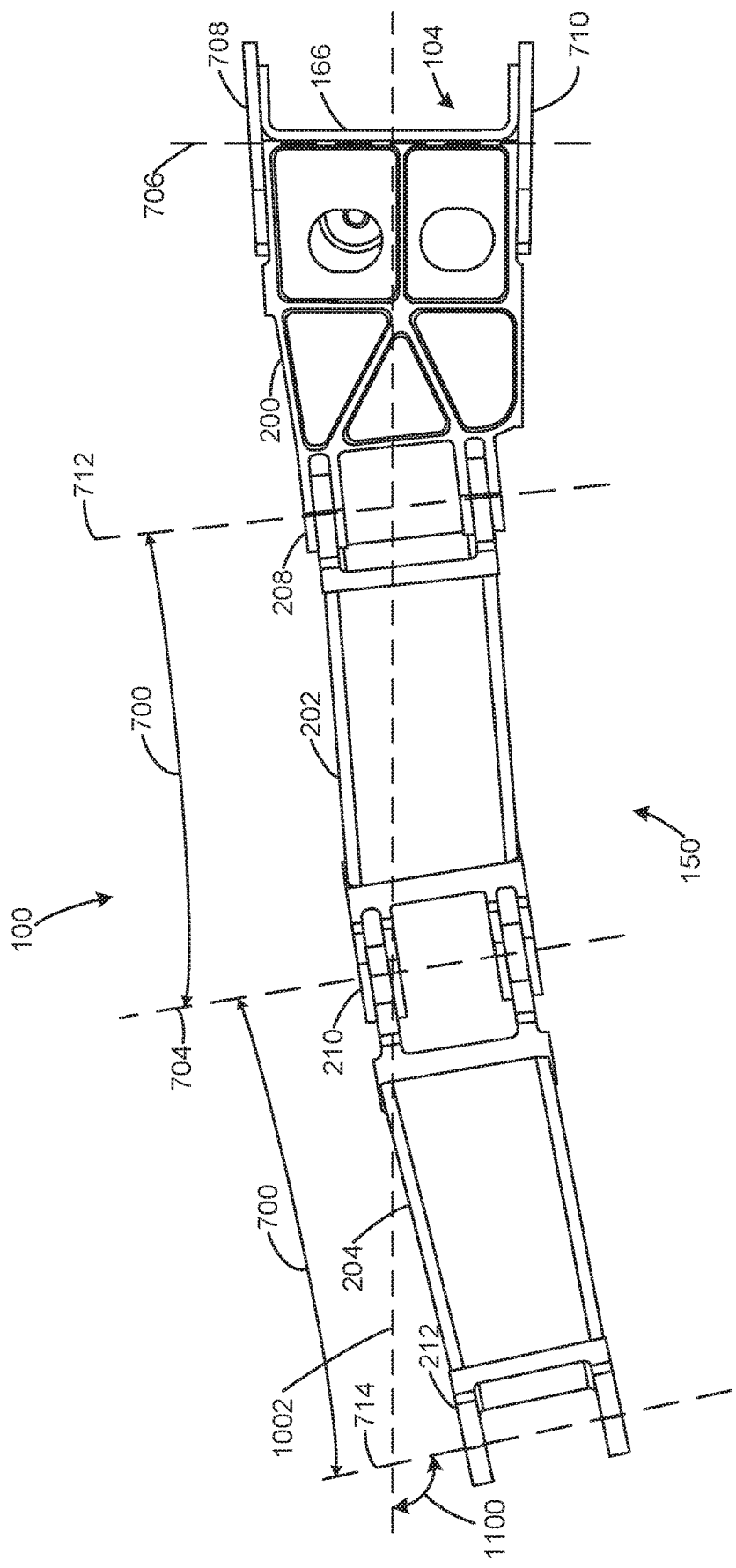
FIG. 11 is an end view of the example support arm of FIG. 10 in a deployed position.

FIG. 11 is an end view of the detailed portion of FIGS. 7-8 of the first example support arm 150 of FIGS. 1-3 and 5-8 coupled to the first wing 104 of FIGS. 1-8 and 10 in the deployed position. In the illustrated example, the second and the third support members 202, 204 are fully extended. In the illustrated example, the third support member 204 is at a first flap droop angle 1100 with respect to the fifth longitudinal axis 714 and the horizontal axis 1002 of FIG. 10 based on the camber angle 700 of FIGS. 7-8 and 9A. In the illustrated example, the camber angle 700 is an angle with respect to the second and fourth longitudinal axes 704, 712. In the illustrated example, the camber angle 700 is also an angle with respect to the second and the fifth longitudinal axes 704, 714.

In some examples, the first flap droop angle 1100 is adjusted based on configuring the camber angle 700. For example, the first flap droop angle 1100 may be increased due to an increase in the camber angle 700. In another example, the first flap droop angle 1100 may decrease due to a decrease in the camber angle 700.

Figure 12A:
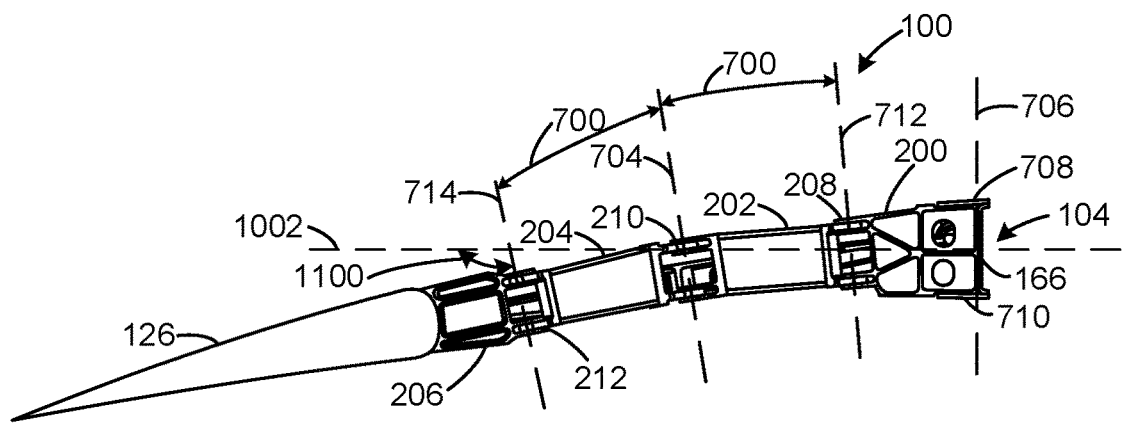
FIG. 12A is a side view of the example trailing-edge flap of FIGS. 1-6 in a deployed position based on the camber angle of FIG. 9A.

FIG. 12A is a side view of the first example trailing-edge flap 126 of FIGS. 1-6 in a deployed position based on the camber angle 700 of FIGS. 7-9A and 11. In the illustrated example, the first trailing-edge flap 126 is extended away from the main portion of the first wing 104 at the first flap droop angle 1100 of FIG. 11. In the illustrated example, the amount of droop of the first trailing-edge flap 126 is based on the first flap droop angle 1100 of FIG. 11. In the illustrated example, the first flap droop angle 1100 of FIG. 11 is based on the camber angle 700.

Figure 12B:
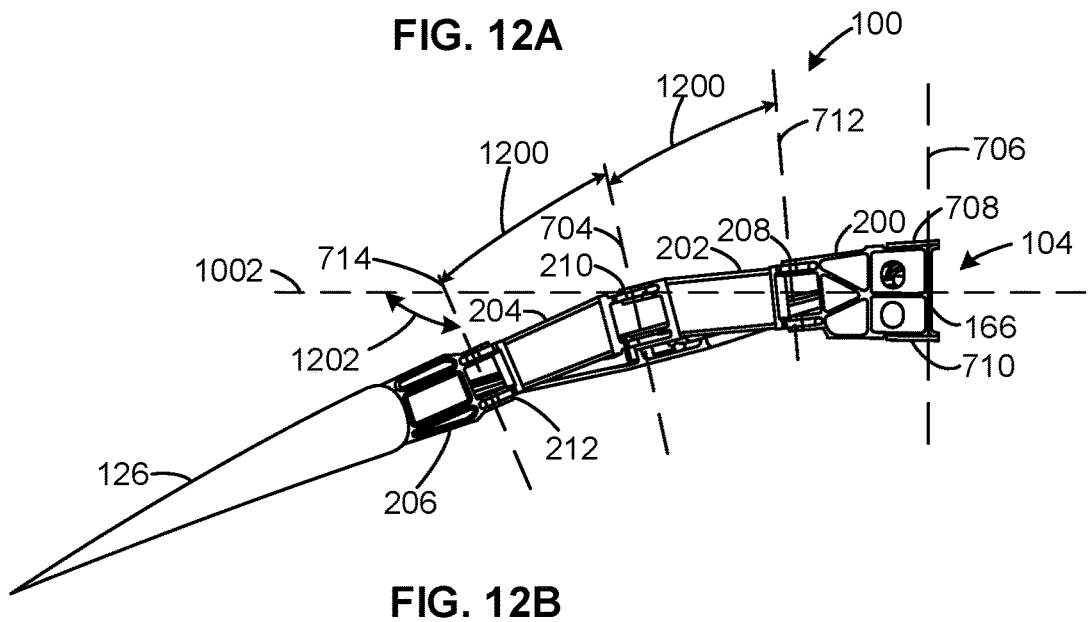
FIG. 12B is a side view of the example trailing-edge flap of FIGS. 1-6 in a deployed position based on another camber angle.

FIG. 12B is the side view of FIG. 12A depicting the first example trailing-edge flap 126 of FIGS. 1-6 in a deployed position based on a second camber angle 1200. In the illustrated example, the second camber angle 1200 is an angle with respect to the second longitudinal axis 704 and the fourth longitudinal axis 712 of FIGS. 7-8 and 10-11 and 12A. In the illustrated example, the second camber angle 1200 is also an angle with respect to the second and the fifth longitudinal axes 704, 714. In the illustrated example, the first trailing-edge flap 126 is extended away from the main portion of the first wing 104 at a second flap droop angle 1202 with respect to the horizontal axis 1002 of FIGS. 10-11 and 12A. In the illustrated example, the amount of flap camber of the first trailing-edge flap 126 is based on the second flap droop angle 1202. In the illustrated example, the second flap droop angle 1202 is based on the second camber angle 1200. In the illustrated example of FIG. 12B, the second camber angle 1200 is greater than the camber angle 700 of FIGS. 7-9A and 11 and 12A and, thus, resulting in the second flap droop angle 1202 being greater than the first flap droop angle 1100 of FIGS. 11 and 12A.

Figure 12C:
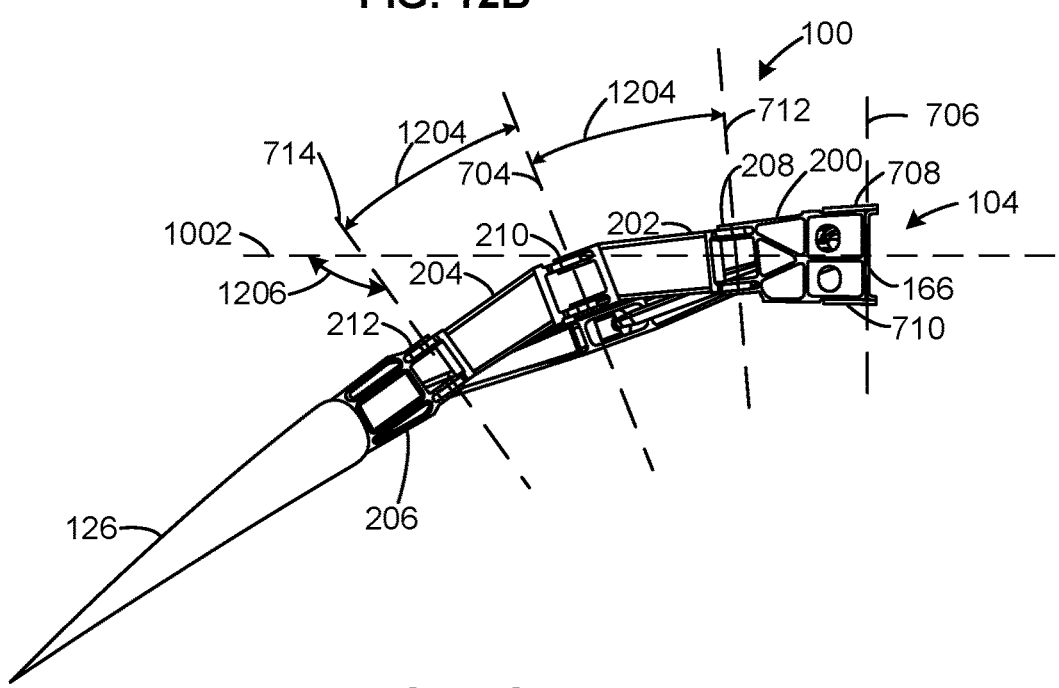
FIG. 12C is a side view of the example trailing-edge flap of FIGS. 1-6 in a deployed position based on yet another camber angle.

FIG. 12C is the side view of FIGS. 12A and 12B depicting the first example trailing-edge flap 126 of FIGS. 1-6 in a deployed position based on a third camber angle 1204. In the illustrated example, the third camber angle 1204 is an angle with respect to the second longitudinal axis 704 and the fourth longitudinal axis 712 of FIGS. 7-8 and 10-11 and 12A-B. In the illustrated example, the third camber angle 1204 is also an angle with respect to the second and the fifth longitudinal axes 704, 714. In the illustrated example, the first trailing-edge flap 126 is extended away from the main portion of the first wing 104 at a third flap droop angle 1206 with respect to the horizontal axis 1002 of FIGS. 10-11 and 12A. In the illustrated example, the amount of flap camber of the first trailing-edge flap 126 is based on the third flap droop angle 1206.

In the illustrated example, the third flap droop angle 1206 is based on the third camber angle 1204. In the illustrated example of FIG. 12C, the third camber angle 1204 is greater than the camber angle 700 of FIGS. 7-9A and 11 and 12A and, thus, resulting in the third flap droop angle 1206 being greater than the first flap droop angle 1100 of FIGS. 11 and 12A. In addition, the third camber angle 1204 is greater than the second camber angle 1200 and, thus, resulting in the third flap droop angle 1206 being greater than the second flap droop angle 1202.

Figure 13:
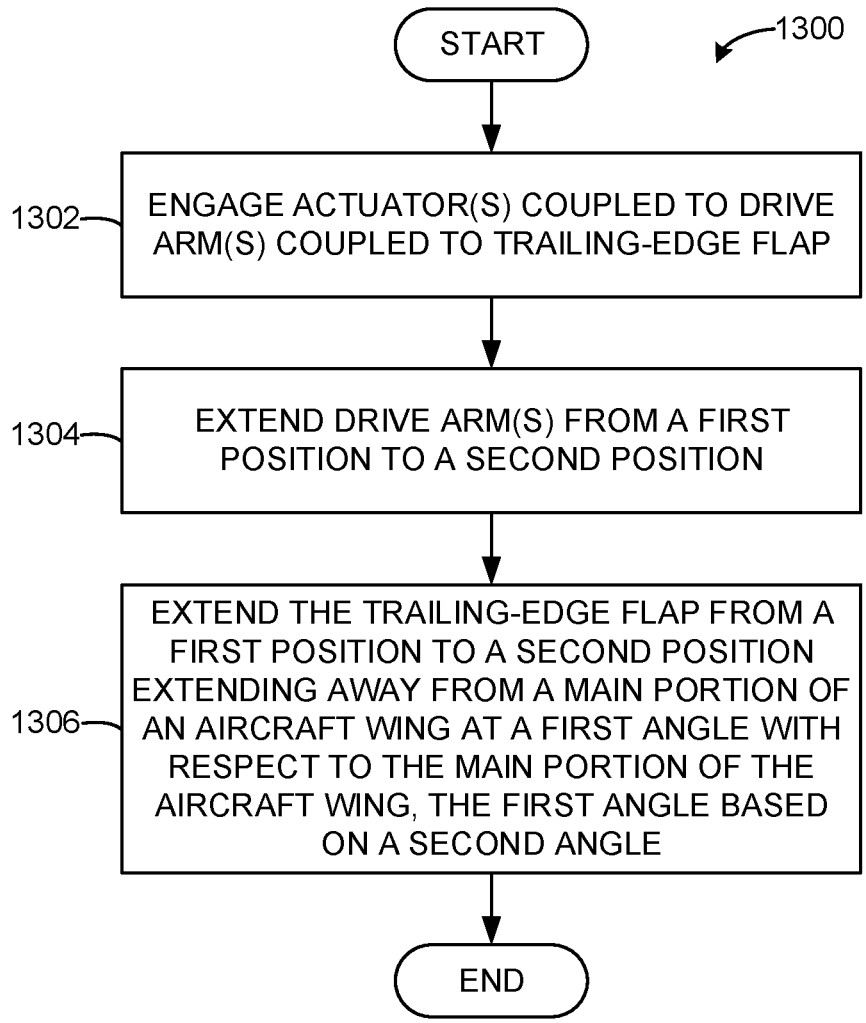
FIG. 13 is a flowchart representative of an example method that may be performed to operate the example high-fowler flap actuation system of FIGS. 1-6.

A flowchart representative of an example method for operating the example high-fowler flap actuation systems 100 of FIGS. 1-6 is shown in FIG. 13. Although the example method is described with reference to the flowchart illustrated in FIG. 13, many other methods of operating the example high-fowler flap actuation systems 100 may alternatively be used. For example, the order of execution of the blocks may be changed, and/or some of the blocks described may be changed, eliminated, or combined.

FIG. 13 is a flowchart representative of an example method 1300 that may be performed to extend one or more of the trailing-edge flaps 126, 128, 130, 132 of FIG. 1 using the example high-fowler flap actuation system 100 of FIGS. 1-8 and 10-12C based on the camber angle 700 of FIGS. 7-9A and 11-12A. The example method 1300 includes engaging actuator(s) coupled to drive arm(s) coupled to a trailing-edge flap (block 1302). For example, the flap drive motor shaft 236 may rotate to engage the actuator 232 to rotate the actuator shaft 234 operatively coupled to the first drive arm 160 of FIGS. 1-6 operatively coupled to the first trailing-edge flap 126. For example, the first trailing-edge flap 126 may be extended or retracted via a criss-cross actuator such as the first drive arm 160. For example, a flap position of the first trailing-edge flap 126 may be controlled via the movable member 230 of the third linear body 220 moving relatively parallel along the rear spar 166 (e.g., along the second axis 402).

The example method 1300 also includes extending the drive arm(s) from a first position to a second position (block 1304). For example, the actuator shaft 234 may rotate to extend the first drive arm 160 from a retracted position to a deployed position.

The example method 1300 further includes extending the trailing-edge flap from a first position to a second position extending away from a main portion of an aircraft wing at a first angle with respect to the main portion of the aircraft wing, the first angle based on a second angle (block 1306). For example, the high-fowler flap actuation system 100 may extend the first trailing-edge flap 126 from the retracted position to the deployed position extending away from the main portion of the first wing 104 at the third flap droop angle 1206 of FIG. 12C with respect to the main portion of the first wing 104, where the third flap droop angle 1206 is based on the third camber angle 1204. In such an example, the extension of the first trailing-edge flap 126 may occur during a test process during assembly, manufacturing operation, flight operation, etc., of the high-fowler flap actuation system 100. The example method 1300 then concludes.

Although the example method 1300 includes extending drive arm(s) and corresponding trailing-edge flap(s), the method may be applied to retracting the drive arm(s) and corresponding trailing-edge flap(s).

As used herein, the terms "including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

From the foregoing, it will be appreciated that example apparatus and related methods have been disclosed that implement a high-fowler flap actuation system. The example high-fowler flap actuation system can be actuated to move from a retracted position to an extended position via linear motion of one or more support members and one or more drive arms of the high-fowler flap actuation system. The example high-fowler flap actuation system can use linear motion to stow or deploy the flaps via a scissor drive linkage and corresponding support arms. The example high-fowler flap actuation systems can achieve a high-fowler motion, a desired amount of flap camber, a desired amount of flap droop, etc., by configuring a camber angle with respect to a coupling of two support arm support members. The example high-fowler flap actuation systems can decrease parasitic drag by reducing and/or eliminating external fairings from an aircraft wing.

Although certain example apparatus and methods and articles of manufacture have been disclosed herein, the scope of coverage of this patent is not limited thereto. On the contrary, this patent covers all apparatus and methods and articles of manufacture fairly falling within the scope of the claims of this patent.

What is claimed is:

1. An apparatus comprising:
a control surface operatively coupled to a wing of an aircraft via a first support arm and a drive arm, the drive arm linearly extendible from a retracted position to a deployed position, the deployed position including the control surface extended away from the wing at a first angle with respect to the wing, the drive arm including a first linear body, a second linear body, and a third linear body, the second linear body including a first end and a second end, the first end directly coupled to the wing via a universal joint and the second end pivotably coupled to the first linear body, the first linear body including a third end and a fourth end, the third end pivotably coupled to the control surface and the fourth end operatively coupled to the wing via a pivotably movable bracket of the third linear body, the pivotably movable bracket movable from the retracted position to the deployed position.

2. The apparatus of claim 1, wherein the control surface is a trailing-edge flap.

3. The apparatus of claim 1, further including at least a second support arm.

4. The apparatus of claim 1, wherein the first support arm includes a first body pivotably coupled to the wing and a second body, the second body pivotably extendible from the first body.

5. The apparatus of claim 4, wherein the first support arm further includes a third body and a fourth body, the third body pivotably extendible from the second body, the fourth body pivotably coupled to the third body and the control surface.

6. The apparatus of claim 5, wherein the first angle is based on a second angle of the second body with respect to the third body.

7. The apparatus of claim 1, wherein the universal joint is a first universal joint, the second end is pivotably coupled to the first linear body via a second universal joint, and the third end is pivotably coupled to the control surface via a third universal joint.

8. The apparatus of claim 1, wherein the second end is pivotably coupled to a midpoint of the first linear body.

9. The apparatus of claim 8, wherein a first length of the second linear body is equal to a second length or a third length of the first linear body, the second length including a first distance between the midpoint and the third end, the third length including a second distance between the midpoint and the fourth end.

10. The apparatus of claim 1, wherein the first and the second linear bodies are configured to move relatively perpendicular along an axis, the axis relatively perpendicular with respect to a trailing-edge of the wing.

11. The apparatus of claim 1, wherein the third linear body is configured to move relatively parallel along an axis, the axis relatively parallel with respect to a trailing-edge of the wing.

12. An apparatus comprising:
a main wing portion of an aircraft including an upper surface, a lower surface, a control surface, and a cavity between a portion of the upper surface and the lower surface; and
a drive arm disposed in the cavity, the drive arm including a first linear body and a second linear body, the first and the second linear bodies extendible from a retracted position to a deployed position, the second linear body including a first end and a second end, the first end directly coupled to the main wing portion via a universal joint and the second end operatively coupled to the first linear body, the first linear body including a third end and a fourth end, the third end operatively coupled to the control surface, the fourth end operatively coupled to the main wing portion.

13. The apparatus of claim 12, further including a support arm disposed in the cavity, the support arm including a first body and a second body, the first body coupled to the main wing portion and the second body operatively coupled to a third body of the support arm, the third body operatively coupled to a fourth body of the support arm, the fourth body coupled to the control surface.

14. The apparatus of claim 13, wherein the second body is operatively coupled to the third body at a first angle.

15. The apparatus of claim 14, wherein the deployed position includes the control surface extending away from the main wing portion at a second angle with respect to the main wing portion, the second angle based on the first angle.

16. A method comprising:
engaging an actuator coupled to a drive arm coupled to a control surface;
extending the drive arm from a first position to a second position, extending the drive arm including:
extending a first linear body from the first position to the second position along a first axis and a second axis, the first linear body including a first end operatively coupled to the control surface, a midpoint operatively coupled to a second linear body, and a second end operatively coupled to a main wing portion via a third linear body; and
extending the second linear body from the first position to the second position along the first axis and the second axis, the second linear body including a third end directly coupled to the main wing portion via a universal joint and a fourth end operatively coupled to the first linear body; and extending the control surface from a retracted position to a deployed position, the deployed position including the control surface extending away from the main wing portion of an aircraft wing at a first angle with respect to the main wing portion, the first angle based on a second angle.

17. The method of claim 16, further including extending the third linear body from the first position to the second position by moving a sliding member along the third linear body from the first position to the second position, the first position corresponding to the control surface in the retracted position, the second position corresponding to the control surface in the deployed position.

18. An apparatus comprising:
a drive arm to be operatively coupled to a control surface of an aircraft, the drive arm to be coupled to a wing of the aircraft, the drive arm including:
  a first linear body having a first end and a second end, the first end to be operatively coupled to the control surface, the second end to be operatively coupled to the wing; and
  a second linear body, the second linear body including a third end and a fourth end, the third end to be directly coupled to the wing via a universal joint, the fourth end operatively coupled to the first linear body.

19. The apparatus of claim 18, further including a third linear body to be coupled to the wing, the third linear body having a pivotably movable bracket coupled to the second end.

20. The apparatus of claim 19, wherein the drive arm is linearly extendible from a retracted position to a deployed position, the deployed position including the control surface extended away from the wing at a first angle with respect to the wing, the pivotably movable bracket movable from the retracted position to the deployed position.

* * * * *